United States Patent [19]
Huffman et al.

[11] 3,889,467
[45] June 17, 1975

[54] ACCUMULATOR ARRANGEMENT FOR A BOOSTER BRAKE MECHANISM

[75] Inventors: Herman M. Huffman, Owosso; Kenneth B. Swanson, Bannister; Kenneth D. Jensen, Owosso, all of Mich.

[73] Assignee: Midland-Ross Corporation, Cleveland, Ohio

[22] Filed: June 24, 1974

[21] Appl. No.: 482,482

[52] U.S. Cl. .................................. 60/548; 60/413
[51] Int. Cl. .............................................. F15b 7/00
[58] Field of Search ............ 60/533, 547, 582, 584, 60/585, 413, 418

[56] References Cited
UNITED STATES PATENTS

| | | | |
|---|---|---|---|
| 2,472,695 | 6/1949 | Chouings | 60/547 X |
| 2,818,711 | 1/1958 | Lincoln et al. | 60/418 X |
| 2,945,352 | 7/1960 | Stelzer | 60/582 X |
| 3,719,044 | 3/1973 | Bach | 60/547 X |
| 3,785,393 | 1/1974 | Tanguy | 60/418 X |
| 3,793,829 | 2/1974 | Swanson | 60/547 |
| 3,827,242 | 8/1974 | Belart | 60/582 X |
| 3,841,095 | 10/1974 | Baker | 60/413 X |

Primary Examiner—Martin P. Schwadron
Assistant Examiner—H. Burks, Sr.
Attorney, Agent, or Firm—Frank J. Nawalanic

[57] ABSTRACT

A hydraulic booster is provided with a pressure responsive dump valve and check valve arrangement which permits the booster to employ an accumulator ideally responsive to automotive brake applications. The check valve is operable to automatically charge the accumulator when the booster fluid source is called upon to supply fluid at operating pressure to the booster or other devices. The dump valve includes a stepped piston arrangement biased into a closed position by backpressure from the fluid source and operable by accumulator pressure to automatically dump the accumulated charge to the booster when source backpressure drops below a predetermined value.

13 Claims, 2 Drawing Figures

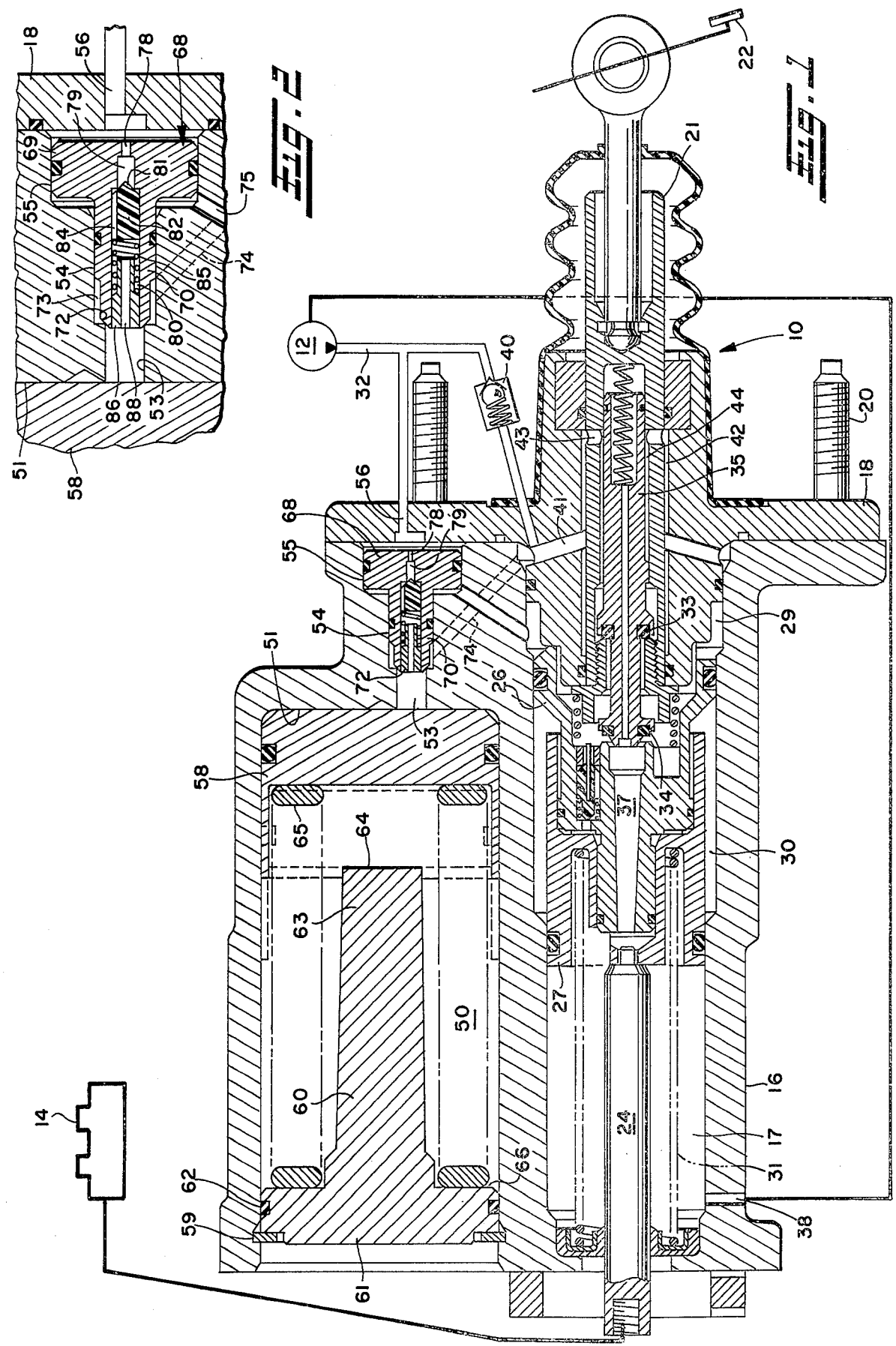

ACCUMULATOR ARRANGEMENT FOR A BOOSTER BRAKE MECHANISM

This invention relates to a booster mechanism and, more particularly, to an accumulator arrangement for use with the booster.

The invention is particularly applicable to an accumulator for use with a hydraulic brake booster on automotive vehicles and will be described with particular reference thereto. However, it will be appreciated by those skilled in the art that the invention has broader applications and may be applied in any type of application wherein an accumulator is to be charged with a fluid, either gas or liquid, for use in actuating a powered unit or prime mover or the like.

Vacuum-operated accessories, including emission control devices in current use on today's automotive vehicles, have limited the vacuum available and, hence, the effectiveness of vacuum-operated booster brake units. Accordingly, alternative power sources effective to achieve adequate power braking of automotive vehicles are under investigation. The open center, power steering pump in current use on today's vehicles provides an ideal source of pressurized fluid to operate a booster mechanism and several hydraulic booster designs have undergone extensive testing to verify this fact. All such booster designs, however, must be provided with an accumulator to store a predetermined volume of fluid under pressure which is discharged into the booster for operating same in the event the pump fails or is simply unactuated because the vehicle's engine is not operating.

Heretofore, the use of such accumulators, whether separate or integral with the booster, has been prohibitive, both from a cost and design standpoint, primarily because of the extensive valving required to permit the accumulator to function in a booster brake environment.

It is thus an object of the subject invention to provide an accumulator with a valving arrangement readily adaptable for use with an automotive type booster brake mechanism.

This object along with other features of the subject invention is achieved in a brake booster mechanism operable by a source of fluid and including a housing having a central cavity therein. An input member extends within the cavity and an output member extends from the cavity at the opposite end thereof. In between the input and output members is a piston arrangement for moving the output member in response to movement of the input member. Inlet and outlet valve mechanisms associated with the input member and piston arrangement are operable in response to movement of the input member to provide varying degrees of fluid communication between a power chamber at one side of the piston arrangement and the source. Associated with the housing is an accumulator chamber operable to store a predetermined volume of fluid. Interposed between the fluid source and the accumulator chamber is a two-position pressure responsive dump valve mechanism biased toward a first position to provide fluid communication between the accumulator chamber and the inlet and outlet valving mechanisms when source pressure drops below a predetermined value and biased towards a second position preventing fluid communication between the accumulator chamber and the valving mechanisms when source pressure exceeds a predetermined value. Associated with the dump valve is a check valve mechanism operable to automatically provide fluid communication between the source and the accumulator chamber whenever the source pressure is greater than the accumulator pressure. When the fluid source is an open center, power-steering pump, normal backpressure of the pump is sufficient to maintain the dump valve mechanism in its second position.

Another feature of the subject invention resides in the configuration of the dump valve which utilizes unequal piston areas to insure that fluid at a relatively high pressure is trapped within the accumulator when the fluid source is at a relatively low pressure and additionally includes the check valve arrangement as a part thereof.

Yet another feature of the subject invention includes a passage leading from the power chamber to the dump valve to assure quick movement of the dump valve from its second to its first position thereby making the valve more responsive to predetermined pressure drops from the fluid source.

It is thus another object of the subject invention to provide in a booster mechanism a unique valving arrangement which enables the booster to employ an accumulator either as a separate or integral part thereof for purposes normally associated with such accumulator.

The invention may take physical form in certain parts and arrangement of parts, a preferred embodiment of which will be described in detail herein and illustrated in the accompanying drawing which forms a part hereof and wherein:

There is shown a longitudinally sectioned view of a hydraulic booster brake mechanism embodying the invention while illustrating, schematically, associated certain components of a braking system.

Referring now to the drawing wherein the showings are for the purpose of illustrating a preferred embodiment of the invention only and not for the purpose of limiting same, there is shown a hydraulically operated booster brake mechanism 10 adapted to be operated by a source of fluid pressure 12 to in turn actuate a conventional master brake cylinder 14 for applying the brakes of an automotive vehicle.

The source of fluid pressure 12 employed in the embodiment illustrated is a typical open center, hydraulic pump currently used on automotive vehicles to effect "power steering" of the vehicle. It is sufficient for an understanding of the subject invention to note that when the vehicle's engine is running and the power steering gear is unactuated, resistance to flow of fluid through the power steering gear creates a backpressure on the pump, typically, a minimum value in the order of 40 psi. When booster 10 is actuated, a proportioning or integrating valve (not shown) creates a demand on pump 12 to significantly increase the output pressure therefrom. Reference may be had to U.S. Pat. No. 3,796,134 entitled "Hydraulic Booster Brake Mechanism" for an explanation of the workings of such a valve. It is sufficient for an understanding of the subject invention to note that when the automotive vehicle's engine is not running or when a failure in pump 12 occurs, the pressure therefrom is zero; when the vehicle's engine is running and the power steering gear and booster are unactuated, pump 12 delivers a minimum backpressure of approximately 40 psi and that when the booster and/or the power steering gear is actuated, the pressure developed by pump 12 significantly increases.

The booster brake mechanism 10 includes a housing 16 having a cavity 17 extending therethrough. At one end of cavity 17 is a flanged tubular end cap 18 provided with studs 20 for mounting the booster to the firewall of the vehicle in the customary manner. Extending within the tubular portion of end cap 18 and into cavity 17 is an input member 21 connected to brake pedal 22 whereby booster mechanism 10 is actuated by the vehicle operator's foot. Extending from cavity 17 at the opposite end is an output member 24 adapted to be secured in a conventional manner to master brake cylinder 14.

In between input member 21 and output member 24 is a piston arrangement shown herein to include a primary piston 26 and a secondary piston 27 to effect a selected travel ratio between output member 24 and input member 21. The piston arrangement includes a power chamber 29 formed within cavity 17 for effecting movement of primary and secondary pistons 26, 27. That is, when power chamber 29 is pressurized, primary piston 26 will move towards the left as viewed in the drawing to trap fluid in an annular space, shown at 30, which, when pressurized, results in further leftward movement of secondary piston 27, all of which displaces output member 24 in a direction out of cavity 17. When power chamber 29 is relieved of its pressure, return spring 31 biases primary and secondary pistons 26, 27 into their normal unactuated position as shown in the drawing.

Power chamber 29 is pressurized at varying pressure levels depending upon the opening and closing of an inlet valve 33 and exhaust valve 34 carried on a floating, spring-biased tubular valve member 35 received within input member 21. With booster mechanism 10 in its unactuated position as shown in the drawing, inlet valve 33 is closed and exhaust valve 34 is open thereby communicating power chamber 29 through a passage 37 to an exhaust passage 38 which is at the return side of pump 12 and at return pressure. (The integrating or proportioning valve referred to above maintains fluid in the booster mechanism 10 downstream of inlet valve 33 at return line pressure.) Upstream of inlet valve 33, booster mechanism 10 is in fluid communication with the high pressure side 32 of pump 12 through the one-way check valve shown schematically at 40, radial passages 41, annular passage 42, radial passages 43 and annular passage 44. When pedal 22 is depressed, input member 21 moves axially towards the left as viewed in the drawing to close exhaust valve 34 thereby preventing fluid communication between power chamber 29 and the return side of pump 12. Further movement of pedal 22 opens inlet valve 33 to pressurize power chamber 29 at a selective pressure dependent upon, among other things, the extent that inlet valve 33 was opened. Pressurization of power chamber 29 results in movement of the piston arrangement which, if the operator ceases to depress pedal 22, will result in inlet valve 33 undergoing a follow-up motion to reseat itself thereby maintaining fluid within power chamber 29 at a predetermined pressure. To understand the subject invention, it is sufficient to note that movement of input member 21 affects closing and opening of outlet and inlet valve members 34, 33 respectively which in turn pressurizes power chamber 29 to effect movement of the piston arrangement 26, 27 which in turn results in movement of output member 24. Reference may be had to a copending application entitled "Pedal ratio Control for Hydraulic Booster" by K. B. Swanson and H. M. Huffman, Ser. No. 461,003, filed Apr. 15, 1974 and assigned to the present assignee for a more detailed explanation of the valving and piston arrangement than that disclosed herein.

Booster housing 16 also has a cylindrical blind chamber 50 having a closed end wall 51 in fluid communication with a cylindrical accumulator passage 53 of predetermined diameter. Accumulator passage 53 in turn is in fluid communication with a cylindrically-stepped bore having a first smaller diameter opening 54 in fluid communication with a second larger diameter opening 55. Larger diameter opening 55 in turn is in fluid communication with an inlet passage 56 formed in the flanged portion of end cap 18 and shown in fluid communication with the output side 32 of pump 12. Disposed within and in sealing engagement with blind chamber 50 is a cylindrical accumulator piston 58. Retained as by snap ring 59 adjacent the open end of blind chamber 50 is a cylindrically configured, "T-shaped" retention member 60. Retention member 60 has a cylindrical base portion 61 approximately the diameter of blind chamber 50 and sealed with respect thereto as by O-ring 62. Extending from base 61 is a smaller cylindrical portion 63 having a flat axial end face or stop surface 64 at the end thereof. Retention portions 61, 63 form an annular surface 66 functioning as a seat for one end of an accumulator spring 65 which seats at its opposite end against accumulator piston 58. Spring 65 normally tends to bias accumulator piston 58 against blind chamber end wall 51 as shown in the drawing. Pressure, greater than the spring force, will move accumulator piston 58 away from end wall 51 and against stop surface 64 to provide an accumulator chamber defined as that portion of blind chamber 50 between end wall 51 and accumulator piston 58.

Disposed within first and second cylindrically-stepped openings 54, 55 is a T-shaped dump valve 68 having a large diameter piston portion 69 sealing disposed within larger diameter opening 55 and a smaller diameter piston portion 70 depending from large diameter piston portion 69 and similarly sealed within first smaller diameter opening 54. The end of small diameter piston portion 70 is chamferred as at 72 to function as a valve element for sealing against a seat defined as the intersection of accumulator passage 53 and first small diameter opening 54 when dump valve 68 is biased towards the left into its second position as shown in the drawing. The longitudinal width of large diameter piston portion 69 of the dump valve is smaller than the longitudinal width of larger diameter opening 55 thereby permitting dump valve 68 to shift from its second position illustrated towards the right into its first position whereat the opposite end of dump valve 68 abuts against end cap 18 and opens valve element 72. To provide a fluid receiving area 73, the end port of small diameter piston portion 70 is reduced and fluid receiving area 73 communicates with a charging passage 74 in the booster housing which in turn communicates with one of the radial passages 41 leading to inlet valve 33. In fluid communication with large diameter opening 55 and at the intersection or juncture of the large and small piston portions 69, 70 is a fast response passage 75 communicating with power chamber 29.

A three-stepped, centrally located cylindrical passage extends through the center of dump valve 68. The smallest diameter passage or orifice 78 extends from the end wall of the larger dump valve piston portion 69. This orifice portion communicates with a larger intermediate passage 79 which in turn communicates with a still larger cylindrical passage 80 extending through small diameter dump valve piston portion 70. The juncture between the intermediate and large diameter passages 79, 80 forms an annular valve seat 81 against which the conical end of a resilient check valve element 82 normally seats to prevent fluid flow into passage 79. Valve element 82 has a plurality of circumferentially spaced flutes 84 which permit fluid to pass therebetween when element 82 is in a retracted position. A spring 85 seated at one end against a brass retention member 86 similar to retention member 60 in the accumulator normally biases valve element 82 against seat 81. Brass retention member 86 is press-fitted into larger cylindrical passage 80 and has a longitudinally extending opening 88 extending therethrough in fluid communication at one end with accumulator passage 53 and at its other end with large cylindrical passage 80.

As thus described, the operation of the booster mechanism will be explained first with reference to the position of the parts as shown and pump 12 unactuated. Pump 12 is actuated when the operator of the vehicle starts the engine. Because the brakes have not been actuated nor the steering wheel turned, pump 12 develops a backpressure communicated to inlet passage 56 by resistance to flow of fluid through the steering gear and this backpressure will be assumed, for purposes of explanation, to be 40 psi. This pressure will act against the end face of dump valve large diameter piston portion 69 biasing dump valve 68 into its second position and simultaneously opening one-way check valve element 82 to permit fluid at backpressure to flow into accumulator passage 53. Because accumulator spring 65 is sized to exert a force greater than this backpressure, the pressure in passage 53 will equal the pressure at the front end of large dump valve piston portion 69 and check valve element 82 will close against its seat. Because the area at the front end of large diameter piston portion 69 is significantly greater than the area at the rear end of small diameter piston portion 70, dump valve 68 remains in its second position illustrated. It will be assumed for explanation that the area at the front of dump valve 68 is nine times greater than the area at the rear of the dump valve.

The vehicle operator now makes a demand on the pump by actuating the steering gear or the brake, or both, and pump output pressure increases. Check valve element 82 is displaced from annular valve seat 81 and fluid enters accumulator passage 53 at sufficient pressure to displace accumulator piston 58 rearwardly in blind chamber 50 until piston 58 abuts against stop surface 64 of retention member 60. When this occurs, the pressure of the fluid thus trapped within the accumulator chamber will build to a value approximately equal to or slightly less than the output pressure of the pump whereat check valve element 82 will seal itself against valve seat 81. When the demand is no longer made on the pump, the pump output will decrease to its backpressure level of 40 psi and, because of the differential in dump valve areas (9 to 1), the accumulator will remain charged at approximately 360 psi with the dump valve in its second position as shown. Because the pressure of the fluid in the accumulator chamber is significantly greater than the backpressure, the check valve remains closed. If the output of the pump as previously described had exceeded a pressure of 360 psi, the dump valve would have momentarily shifted into its first position after pump output dropped until the pressure within the accumulator dropped to its predetermined level, i.e., 360 psi, which pressure is generated by the force of spring 65. In this connection, it should be noted that since accumulator piston 58 contacts stop surface 64, to define a fixed chamber, this drop in pressure will occur without any significant fluid flow. If this should occur when the passages in the booster leading to booster inlet valve 33 are completely filled with fluid, it is conceivable that dump valve 68 may remain in its first position until the next application of the brakes. If this should occur, the follow-up valving in the booster mechanism 10 prevents the booster from being adversely affected by the presence of high pressure at inlet valve 33.

With the accumulator thus charged, it should be apparent that whenever backpressure from pump 12 drops below its predetermined level (40 psi) which would occur if there was a pump failure or the vehicle's engine was stopped, dump valve 68 would shift towards its first position because of accumulator pressure acting at the small piston portion 70 of dump valve 68. This will provide fluid communication between booster inlet valve 33 and the fluid thus stored in the accumulator via passages 74, 41, etc. The total volume of the accumulator which is sufficient to make several brake applications is now held open and ready to discharge at booster inlet valve 33. When the brake application is made, fluid pressurized as a function of accumulator spring 65 will flow into power chamber 29 for movement of the piston arrangement and simultaneously will enter fast response passage 75 to assure that dump valve 68 will quickly shift into its first position. Without fast response passage 75, the movement and consequential opening of valve seat 72 might be slow and this would cause an undesirable sudden and excessive braking of the vehicle. Furthermore, the presence of fast response passage 75 does not adversely affect the performance of the booster during normal brake application. That is, the pressure in power chamber 29 may be sufficient during normal brake application to shift dump valve 68 towards its first position thereby providing fluid communication between the accumulator chamber and inlet valve 33. Because the valving of the booster is of the follow-up type as explained above and the pressurization of power chamber 29 is, for all practical purposes, instantaneous with the opening of inlet valve 33, the vehicle operator will not experience any difference in the rate of brake application through pedal 22.

The invention has been described with reference to a preferred embodiment. Obviously modifications and alterations will occur to others upon reading and understanding the specification. For example, while a spring actuated accumulator has been illustrated, it should be apparent that other types of accumulators such as gas actuated accumulators and accumulators which may or may not be an integral part of the booster housing could be used in place thereof. Also, while the valving associated with the accumulator has particular application for a hydraulic booster, it is contemplated that the valving arrangement disclosed is applicable to other fluid actuated booster mechanisms such as those operated by either negative or positive air pressure differentials. The source of fluid in such instances need only develop a minimum air pressure which could become a zero value when the vehicle's engine was stopped. It is our intention to include all such modifications and alterations insofar as they come within the scope of the present invention.

It is thus the essence of the invention to provide a valving arrangement in a fluid operated booster mechanism which renders the booster mechanism easily adaptable to an accumulator for automotive type brake applications.

Having thus defined the subject invention, we claim:

1. A booster mechanism operable by a source of fluid capable of supplying minimum pressure and a higher operating pressure to the booster mechanism, said mechanism comprising:
    a housing having a longitudinally extending cavity therein, an input member extending into said cavity at one end thereof and an output member extending from said cavity at its opposite end;
    piston means between said input and output members for moving said output member in response to movement of said input member, said piston means including a power chamber at one side thereof;
    inlet and outlet valve means associated with said input member within said cavity and operable upon inward movement of said input member to provide fluid communication between said source at operating pressure and said power chamber for actuating said piston means;
    accumulator chamber means associated with said housing operable to store a predetermined volume of fluid;
    dump valve means interposed between said accumulator chamber means and said source of pressure and check valve means associated with said dump valve means;
    said check valve means operable to provide fluid communication between said source and said accumulator chamber means for charging said accumulator chamber when said source is at operating pressure while preventing fluid communication between said accumulator chamber means and said source when the fluid within accumulator chamber means is at a pressure greater than said minimum pressure of said source,
    said dump valve means operably biased by the pressure from the fluid within said accumulator chamber means towards a first position and operably biased by the pressure from said source towards a second position; and
    first passage means within said housing providing fluid communication between said inlet and outlet valving means and said accumulator chamber means when said dump valve means is in its first position while preventing communication therebetween when said dump valve means is in its second position.

2. The booster mechanism of claim 1 wherein said dump valve means is operable biased into said second position when said pressure from said source is at or greater than said minimum pressure while said dump valve means is operably biased into said first position when said pressure from said source is zero.

3. The booster mechanism of claim 2 further including second passage means within said housing providing fluid communication between said power chamber and said dump valve means operable to effect quick movement of said dump valve means from its second to its first position when said pressure from said source is reduced to zero.

4. The booster mechanism of claim 3 wherein:
    said dump valve means includes said housing having a cylindrically-stepped passage comprising a first smaller opening contiguous with a second larger opening, said second larger opening adapted to be in fluid communication with said source and said smaller opening in fluid communication with said accumulator chamber means;
    a cylindrically-stepped dump valve disposed within said cylindrically-stepped passage, said dump valve having a first smaller piston portion in sealing engagement with said first smaller opening and a second larger piston portion in sealing engagement with said second larger opening;
    dump valve means at the end of said first smaller piston portion effective to prevent fluid communication between said accumulator chamber means and said passage means when said dump valve is in said second position; and
    said first smaller piston portion sized in predetermined relationship to said second larger piston diameter portion.

5. Booster mechanism of claim 4 wherein:
    said check valve means includes said dump valve having a cylindrically-stepped passage extending therethrough, said passage having an orifice opening extending from the end of said large piston portion, a larger second opening contiguous with said first orifice opening and a third larger opening extending through said small piston portion and contiguous with said intermediate opening, the juncture of said third and second openings defining a valve seat;
    a cylindrical valve element disposed in said third opening and having a conical end and a plurality of fluted passages circumferentially spaced about its periphery; and
    biasing means within said third opening for urging said conical end of said valve element into engagement with said valve seat between said second and third openings.

6. The booster mechanism of claim 5 wherein:
    said second passage means includes
        said housing having a fast response passageway communicating at one end with said power chamber and at its other end with said large piston portion adjacent the juncture of said large piston portion with said small piston portion.

7. In a hydraulic brake booster operable by a source of fluid delivered from a pump supplying varying pressures between minimum and maximum values, said booster having a housing with a central cavity extending therethrough, an input member extending into said cavity, an output member extending from said cavity, piston means between said input and output members for moving said output member in response to movement of said input member and including a power chamber within said cavity, inlet and outlet valve means operable in response to movement of said input member to provide varying degrees of fluid communication between said power chamber and said source, the improvement comprising:

accumulator chamber means associated with said housing and operable to store a predetermined volume of fluid;

a two-position dump valve interposed between said source and said accumulator chamber, said dump valve in its first position providing fluid communication between said accumulator chamber means and said inlet and outlet valving means and in its second position preventing fluid communication between said accumulator chamber means and said inlet and outlet valving means; and check valve means associated with said dump valve operable to provide fluid communication between said source and said accumulator chamber means when said source is at a pressure greater than said minimum value and preventing fluid communication between said source and said accumulator chamber means when said source is at or less than said minimum pressure.

8. The hydraulic booster of claim 7 wherein said dump valve includes a cylindrically-stepped piston sealingly slidable within a cylindrically-stepped passage within said housing, said piston having a larger effective area at one end thereof than the other, said larger area adapted to be exposed to said source and said smaller area being exposed to said accumulator chamber means.

9. The hydraulic booster of claim 7 wherein:

said dump valve piston has a bore extending therethrough, said bore being stepped to define an annular valve seat therein; and said check valve means including a resiliently biased, generally cylindrical valve member disposed within said bore, said valve member having a cone-shaped end adapted to sealingly engage said annular valve seat and at least one longitudinally-extending flute formed at its periphery to permit fluid to pass therethrough.

10. The hydraulic booster of claim 9 wherein:

said dump valve piston is further defined to include a first smaller piston portion depending from a larger diameter piston portion, each piston portion sealingly disposed in respectively sized bores formed within said housing, said bore receiving said smaller piston portion having an annular shoulder defining a dump valve seat adjacent the end of said smaller piston portion, said smaller piston portion end sealingly contacting said annular shoulder valve seat when said dump valve is in its second position; and said housing having a passage in fluid communication with said inlet and outlet valve means at one end thereof and in fluid communication with said smaller bore receiving said smaller piston portion so as to be in fluid communication with said accumulator chamber means when said dump valve is in its first position.

11. The hydraulic booster of claim 10 wherein said housing has a second passage in fluid communication at one end with said power chamber and in fluid communication at its other end with the side of said larger piston portion defined by the juncture between said larger and smaller piston portions whereby the response time of said dump valve during movement between its respective positions is increased.

12. The hydraulic booster of claim 11 wherein:

said accumulator chamber means includes said housing having a cylindrical blind chamber therein, and a third passage in fluid communication with said blind chamber at one end and forming said annular shoulder valve seat at its other end; and biased piston means disposed within said blind chamber.

13. The hydraulic booster of claim 12 wherein said piston means includes a retention member having a cylindrical portion with an axial end face surface disposed within said blind chamber at a predetermined distance, a larger cylindrical base portion depending from said cylindrical portion and forming an annular seat at the juncture therebetween, retention means to secure said base portion within said opening, a cylindrical piston sealingly disposed within said opening between said end wall and said axial surface, and spring means contained between said annular seat formed in said base portion and said piston.

* * * * *